(12) United States Patent
Hanaoka

(10) Patent No.: US 6,678,016 B1
(45) Date of Patent: Jan. 13, 2004

(54) FILTER FOR DISPLAY DEVICE AND DISPLAY DEVICE

(75) Inventor: Hideaki Hanaoka, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/476,787

(22) Filed: Dec. 30, 1999

(51) Int. Cl.⁷ .............................................. H04N 5/64
(52) U.S. Cl. ...................................................... 348/841
(58) Field of Search .............................. 348/818, 823, 348/824, 836, 841; 428/323, 469

(56) References Cited

U.S. PATENT DOCUMENTS

| | | | | |
|---|---|---|---|---|
| 3,708,622 A | * | 1/1973 | Brown, Jr. et al. | 348/824 |
| 3,879,627 A | * | 4/1975 | Robinder | 313/112 |
| 3,909,524 A | * | 9/1975 | Ohkoshi et al. | 348/824 |
| 4,643,785 A | * | 2/1987 | Paynton | 156/101 |
| 4,786,148 A | * | 11/1988 | Sekimura et al. | 349/106 |
| 4,841,372 A | * | 6/1989 | Lee | 348/841 X |
| 4,910,090 A | * | 3/1990 | Kuhlman et al. | 428/469 |
| 5,612,128 A | * | 3/1997 | Endo et al. | 428/323 |
| 5,637,380 A | * | 6/1997 | Kaneko et al. | 428/204 |
| 5,815,313 A | * | 9/1998 | Mitani et al. | 359/448 |
| 5,879,217 A | * | 3/1999 | Saito et al. | 348/824 X |
| 6,417,619 B1 | * | 7/2002 | Yasunori et al. | 313/582 |

FOREIGN PATENT DOCUMENTS

| | | | | |
|---|---|---|---|---|
| JP | 52-87352 | | 7/1977 | |
| JP | 52-87353 | | 7/1977 | |
| JP | 139747 | * | 10/1980 | 348/841 |
| JP | 8-287850 | | 11/1996 | |
| WO | WO98/45828 | * | 10/1998 | |

* cited by examiner

*Primary Examiner*—James O. Hansen
(74) *Attorney, Agent, or Firm*—Rader, Fishman & Grauer PLLC; Ronald P. Kananen

(57) ABSTRACT

A filter for a display device capable of preventing a reduction of the contrast of a display screen which occurs when the mechanical strength of the CRT is strengthened and the panel glass is made thinner or when an antireflection film is formed, including a filter substrate and an adhesive layer formed on an adhering surface of the filter substrate to the display panel and having a function of adjusting a transmittance of visible light to a predetermined value and a display device using the same.

18 Claims, 2 Drawing Sheets

FILTER FOR DISPLAY DEVICE AND DISPLAY DEVICE

BACKGROUND OF THE INVENTION

1. Field of the Invention

The present invention relates to a filter for a cathode ray tube or other display device and a display device having the filter for a display device on a display panel of a cathode ray tube.

2. Description of the Related Art

As a means for preventing flying glass due to implosion of a cathode ray tube (hereinafter also referred to as a CRT), the technique of adhering a plastic blast prevention film to the surface of the panel glass of the CRT is disclosed in Japanese Unexamined Patent Publication (Kokai) No. 52-87352 and Japanese Unexamined Patent Publication (Kokai) No. 52-87353. By adhering this blast prevention film to the display panel of the CRT, the function of preventing flying glass, which had previously relied only on the panel glass and tension band, can be partially shifted to the blast prevention film. By this, it becomes possible to make the panel glass thinner, which is very effective in practical use with respect to lightening the weight of a CRT and a display device using a CRT.

On the other hand, in a CRT, turning on and off a high drive voltage generates static electricity at the display surface. This attracts surrounding dusts and causes an uncomfortable feeling due to electric shock when touched by the hand. In order to prevent the above problems, as disclosed in for example Japanese Unexamined Patent Publication (Kokai) No. 8-287850, the method of coating an antistatic material on the display panel of the CRT to form an antistatic film to reduce the surface resistance to less than, for example, $10^9$ Ω/□ and connecting to a housing of a ground potential to drain the static electricity is effective.

The antistatic film can be formed by mixing, for example fine particles of tin oxide or ITO or other electrically conductive substances as a filler, into for example a rubber-based, acrylic-based, silicon-based, epoxy-based resin, or other resin, coating the obtained mixture on a film, and causing this to cure by heating, irradiation by ultraviolet rays or irradiation by electron beams etc.

Further, when viewing an object through a transparent material, it is extremely troublesome if the reflected light is strong and there is a clear reflected image. In lenses for eyeglasses, for example, if there is a reflected image called a "ghost" or "flare", it will give an uncomfortable feeling to the eyes. Further, in a looking glass, there is the problem that the content is not clear due to the light reflected on the glass surface. Problems similar to those described above also occur in CRTs. In order to avoid them, there has been a growing demand for imparting an antireflection function to the display panel of the CRT.

In the related art, in order to prevent the reflection of light causing these problems, the method has been used of adhering an antireflection filter, having an antireflection film formed by covering a substrate with a substance having a different refractive index from that of the substrate by a vacuum deposition process or the like, on the display panel of the CRT. In this case, it has been known that the selection of the thickness of the antireflection film covering the substrate is important in order to raise the antireflection effect the most. When for example the antireflection film is formed by a single layer, it has been known that formation of the antireflection film by using a substance having a lower refractive index than that of the substrate as the material for forming the antireflection film and selecting an optical film thickness of ¼ of the wavelength of the light being an object of the antireflection, or odd number times thereof, gives the minimum reflection rate, in other words, the maximum transmittance. Here, the "optical film thickness" is given by the product of the refractive index of the material forming the antireflection film and the thickness of the antireflection film. Further, it is possible to form an antireflection film of a multiple layer structure. Some proposals have been made for the selection of the film thickness in this case in for example documents (*Optical Technical Contact*, Vol. 9, No. 8, p. 17 (1971)).

As the material for forming the above antireflection film, an inorganic oxide or an inorganic halide is mainly used in many cases. They generally have both a low reflection rate and a high transmittance in the visible range.

Summarizing the problems to be solved by the invention, in the CRTs of the related art, however, the transmittance of the display light emitted from the fluorescent surface inside the CRT is adjusted by the panel glass, therefore if the weight is lightened by reduction of the thickness of the panel glass, which becomes possible by adhering the blast prevention film, there is the problem that the transmittance of the display light becomes too high, so the contrast of the displayed image is lowered.

Further, due to the formation of an antireflection film made of inorganic oxide or the like on the display panel of a CRT, there is almost no light absorption at the antireflection film and the reflection at the surface is reduced, therefore an effective transmittance of the display light becomes further higher, so the contrast of the displayed image is degraded in the same way as in the above. In this case, the adjustment of the transmittance to an intended value without a change of the panel glass thickness can be generally easily achieved by changing the material of the panel glass, but according to this method, it becomes necessary to use different glass materials for forming the antireflection film and for not forming the antireflection film, and the glass materials must be frequently changed, which becomes a factor behind a decline in productivity and a rise in the manufacturing costs.

Further, in a CRT having a flat display panel, the mechanical strength fundamentally becomes weak; therefore the thickness of the glass at, for example, the ends of the display panel must be larger than the thickness of the glass of the corresponding portions of a general CRT in order to secure the strength. Due to this, there is the inconvenience that the brightness of text, graphics, and other displayed images is clearly different between the center and the ends of the display panel. From this viewpoint, it is desired to use transparent glass (clear glass) as much as possible for the panel glass material. This also raises the transmittance of the display light.

SUMMARY OF THE INVENTION

An object of the present invention is to provide a filter for a CRT or other display device which can prevent a reduction of the contrast of the display screen caused when the panel glass is made thinner by strengthening the mechanical strength of the CRT or when an antireflection film is formed and which can be preferably adhered to even a CRT having a flat display panel and to provide a display device having that filter for a display device on the display panel of a CRT.

To attain the above object, according to a first aspect of the present invention, there is provided a filter for a display device adhered to a display panel of the display device and strengthening a mechanical strength of the display device, comprising a filter substrate and an adhesive layer formed on an adhering surface of the filter substrate to the display panel having a function of adjusting a transmittance of visible light to a predetermined value.

The filter for a display device of the present invention strengthens the mechanical strength of a display device when adhered to the display panel of the display device. Where it is adhered to the display panel of a CRT, the filter for a display device of the present invention strengthens the mechanical strength of the CRT, so it becomes possible to make the panel glass thickness thinner and lighten the weight. Further, if the transmittance of the display light emitted from the fluorescent surface inside the CRT becomes too high by reducing the panel glass thickness, the contrast of the displayed image is lowered, but in the filter for a display device of the present invention, the adhesive layer formed on the surface of the filter substrate adhering with the display panel of the display device has a function of adjusting the transmittance of the visible light to a predetermined value, therefore it becomes possible to properly adjust the transmittance of the display light and suppress the reduction of the contrast of the displayed image.

In the filter for a display device of the present invention, preferably the adhesive layer has a function of adjusting the transmittance of the visible light to a predetermined value by containing at least a dye or a pigment. By adjusting the content of the dye or the pigment, the transmittance of the visible light can be easily adjusted to the predetermined value.

In the filter for a display device of the present invention, preferably an antireflection film is formed on a surface of the filter substrate opposite to the surface of formation of the adhesive layer and further preferably the antireflection film is comprised of a plurality of films. By this, the reflection of light from the display panel of the display device can be suppressed. Further, the adhesive layer formed on the adhering surface with the display panel of the display device can adjust the transmittance of the visible light to the predetermined value, therefore it becomes possible to properly adjust the transmittance of the display light and suppress the reduction of the contrast of the displayed image due to the fact that the effective transmittance of the display light further rises by forming the antireflection film.

In the filter for a display device of the present invention, preferably an antistatic film is formed on a surface of the filter substrate opposite to the surface of formation of the adhesive layer. By this, it further becomes possible to prevent the generation of the static electricity on the display surface of the display device.

Further, to attain the above object, according to a second aspect of the present invention, there is provided a display device comprising a cathode ray tube having at its inside a fluorescent surface emitting light upon being subjected to an electron beam emitted from an electron gun and having a filter for strengthening a mechanical strength of the cathode ray tube adhered to a display panel of the cathode ray tube, wherein an adhering surface of a filter substrate of the filter and the display panel of the cathode ray tube are adhered to each other by an adhesive layer having a function of adjusting the transmittance of visible light to a predetermined value.

In the display device of the present invention, the filter is adhered to the display panel of a cathode ray tube (CRT), whereby the mechanical strength of the CRT is strengthened, so it becomes possible to make the panel glass thinner and thereby realize a reduction of the weight of the display device. Further, if the transmittance of the display light emitted from the fluorescent surface inside the CRT becomes too high by making the panel glass thinner, the contrast of the display device ends up being lowered, but the adhesive layer for adhering the filter and the display panel has the function of adjusting the transmittance of the visible light to a predetermined value, therefore it becomes possible to properly adjust the transmittance of the display light and suppress the reduction of the contrast of the displayed image.

In the display device of the present invention, preferably the display panel of the cathode ray tube is substantially flat. In the case of that the display panel of the CRT is substantially flat, preferably transparent or clear glass is used as much as possible for the panel glass material. Due to this, the transmittance of the display light becomes high, but the adhesive layer for adhering the filter and the display panel has the function of adjusting the transmittance of the visible light to the predetermined value, therefore it easily becomes possible to properly adjust the transmittance of the display light.

In the display device of the present invention, preferably the adhesive layer has the function of adjusting the transmittance of the visible light to a predetermined value by containing at least a dye or a pigment. By adjusting the content of the dye or the pigment, the transmittance of the visible light can be easily adjusted to the predetermined value.

In the display device of the present invention, preferably the antireflection film is formed on a surface of the filter substrate opposite to the surface of formation of the adhesive layer and more preferably the antireflection film is comprised of a plurality of films. By this, the reflection of light from the display panel of the display device can be suppressed. Further, the adhesive layer adjusts the transmittance of the visible light to the predetermined value, so it becomes possible to properly adjust the transmittance of the display light and suppress the reduction of the contrast of the displayed image due to the fact that the effective transmittance of the display light further rises by forming the antireflection film.

In the display device of the present invention, preferably the antistatic film is formed on a surface of the filter substrate opposite to the surface of formation of the adhesive layer. By this, it further becomes possible to prevent the generation of static electricity on the display panel of the display device.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Figure 1:
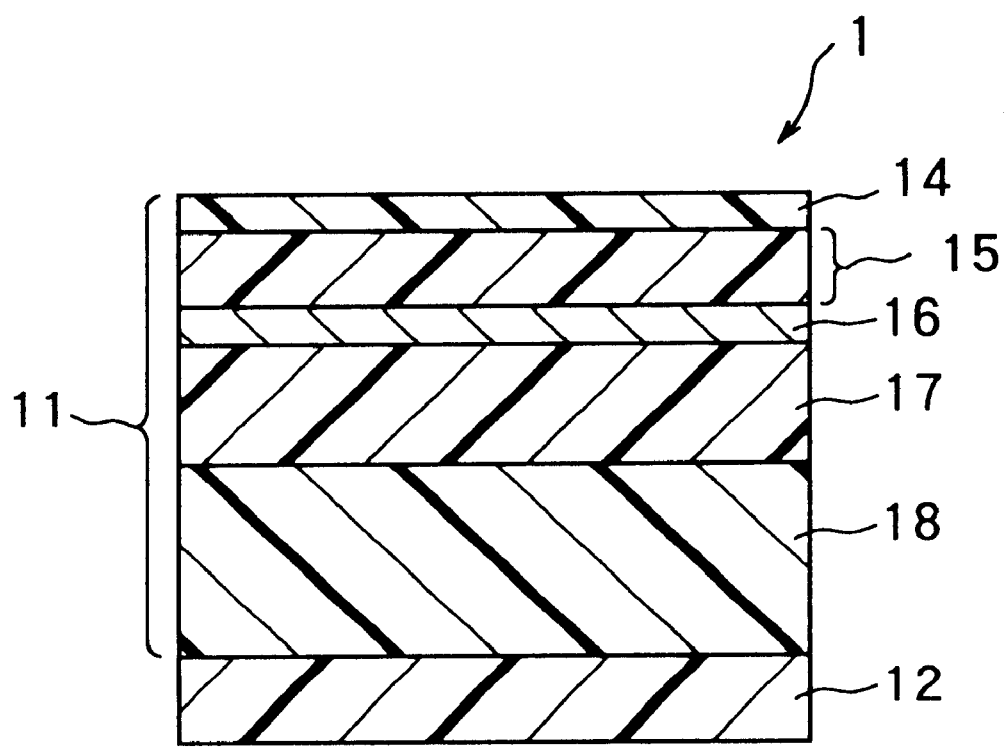
FIG. 1 is a sectional view of a filter for a display device according to a first embodiment of the present invention.

Below, the filter for a display device and the display device according to the present invention will be explained in detail based on preferred embodiments shown in the drawings.

First Embodiment

FIG. 1 is a sectional view of a filter for a display device according to the present embodiment.

A filter 1 for a display device of the present embodiment has a functional film 11 comprising a filter substrate 18 made of a transparent plastic, a hard coat film 17, an antistatic film 16, an antireflection film 15, and a stainproofing film 14 and an adhesive layer 12 formed on the adhering surface with the display panel of the functional film 11.

The filter substrate 18 made of the transparent plastic may be made of any material so far as it is formed by a material made of an organic polymer. In view of the transparency, refractive index, dispersion, and other optical characteristics and shock resistance, heat resistance, durability, or other performance, preferably use can be made of for example polymethylmethacrylate and a copolymer thereof, a polycarbonate, a diethyleneglycol bisarylcarbonate, a di(meth)acrylate polymer of (brominated) bisphenol A and a copolymer thereof, a polymer of a urethane-modified monomer of a mono(meth)acrylate polymer of (brominated) bisphenol A and a copolymer thereof, a polyethylene terephthalate, a polyethylene naphthalate or a polyester such as unsaturated polyester, acrylonitrile-styrene copolymer, polyvinyl chloride, polyurethane, an epoxy resin, or an aromatic polyamide-based resin. The thickness of this filter substrate 18 is not particularly limited, but preferably is about 25 to 500 $\mu$m.

On the surface of the filter substrate 18 opposite to the adhesive layer 12, preferably a hard coat layer 17 having a thickness of for example 3 to 10 $\mu$m is formed. Due to this, it is possible to improve performance such as adhesion, hardness, chemical resistance, durability, friction resistance, and dyeability. As the material of the hard coat layer 17, use can be made of the materials conventionally known as surface-hardening coating films of plastic substrates disclosed in for example Japanese Examined Patent Publication (Kokoku) No. 50-28092, Japanese Examined Patent Publication (Kokoku) No. 50-28446, Japanese Examined Patent Publication (Kokoku) No. 50-39449, and Japanese Examined Patent Publication (Kokoku) No. 51-24368, Japanese Unexamined Patent Publication (Kokai) No. 52-112698, and Japanese Examined Patent Publication (Kokoku) No. 57-2735. Further, it may also be an acrylic cross-linked material obtained from (meth)acrylic acid and pentaerythritol, and so forth.

As the method for forming the hard coat layer 17, use can be made of the method of coating for example an acrylic cross-linked resin material on the upper layer of the filter substrate 18, then causing a cross-linking curing reaction by irradiation of ultraviolet ray or electron beams for curing or the method of coating a silicone-based, melamine-based, or an epoxy-based resin material and curing it by a heat curing reaction.

A transparent antistatic film 16 made of an ITO thin film or other conductive film having a thickness of, for example, 15 nm to 150 nm formed by, for example, a deposition method or a sputtering method is formed on the upper layer of the hard coat layer 17.

The antireflection layer 15 which moderates the transfer of outside light and reproduces preferred text or graphic information may have a single layer structure or multiple layer structure, but is preferably a multiple layer optical thin film obtained by alternately stacking thin film materials having different refractive indexes. As the method for forming the antireflection layer, use can be made of a vacuum deposition process, an ion plating process, a sputtering process, or other various physical vapor deposition (PVD) process or a spray process (refer to "Low Reflection Coating For Leakage Electric Field", technical report by Television Society, Vol. 10, No. 2, '95.1), a dipping process, CVD (Chemical Vapor Deposition) method, coating process, or other chemical film forming process.

In the PVD process, other than $SiO_2$, inorganic compounds such as $Al_2O_3$, $ZrO_2$, $TiO_2$, $TaHf_2$, $SiO$, $TiO$, $Ti_2O_3$, $Y_2O_3$, $Yb_2O_3$, $MgO$, and $CeO_2$ can be preferably applied.

The stainproofing film 14 formed on the outermost surface of the functional film 11 gives resistance to fingerprints or other stains when the surface is directly touched by the hand and enables any adhered stain to be easily removed by dry wiping, wet wiping, or the like. As the material comprising the stainproofing film 14, use is made of a thin film of a coating agent based on a silicone resin and containing a perfluoro group or a coating agent based on an acryl resin and containing a perfluoro group.

The adhesive layer 12 formed on the adhering surface of the functional film 11 with the display panel comprises as a principal ingredient, for example, an epoxy-based, rubber-based, acrylic-based, silicon-based, or other various types of adhesives plus an ultraviolet ray cross-linking reaction promoter and has the function of adjusting the transmittance of the visible light to a predetermined value by adding a dye or a pigment to a predetermined concentration. For example, use can be made of a composition containing 10% by weight of a bisphenol A type epoxy (meth)acrylate having a molecular weight of 550 or more, 20% by weight of urethane (meth)acrylate, 65% by weight of a hydroxy group-containing mono(meth)acrylate, 3% by weight of a photo-polymerization initiator, and several percent of an additive. From the viewpoint of stability and uniformity of the transmittance and the durability, a pigment is more preferred. Further, at the selection of the dye or the pigment, ones having a black, gray, or other desired color can be deliberately used. Further, as this adhesive layer 12, in order not to degrade the quality of the text, graphics, and so forth displayed on the display screen, the haze value must be 20% or less, preferably 5% or less. The transmittance of the adhesive layer 12 is preferably 90% or less, more preferably 40% to 90%. Further, as the adhesive layer 12, preferably use is made of one adjusted so that the difference between the refractive index of the cured object thereof and the refractive index of the material comprising the display panel of the display device becomes less than 0.8%.

The adhesive layer 12 can be formed by removing the bubbles contained in an adhesive having the predetermined transmittance, then coating it on the adhering surface of the functional film 11 to the display panel by, for example, a flow coating process, a roll coating process, a bar coating process, or the like, then drying it.

Further, the antistatic film 16 formed on the functional film 11 can achieve an antistatic effect by draining the accumulated charge of the display panel by connecting to the ground potential via a conductive tape or the like.

The filter for a display device of the present embodiment can be used by adhering it onto, for example, the display panel of a CRT or other display device by using a rubber roller, metallic roller, or other roller while applying pressure so as not to leave bubbles or make wrinkles, then going through a solidification step of the adhesive layer such as irradiation of ultraviolet rays or irradiation of electron beams.

The filter for a display device of the present embodiment can be used adhered onto the display panel of a CRT or other display device. In a CRT, by strengthening the mechanical strength of the display device, the thickness of the panel glass can be reduced and the weight of the display device can be lightened. In addition, it is possible to prevent a reduction of the contrast of the display screen which occurs when panel glass is made thinner or an antireflection layer is formed. Further, it is also not necessary to switch the materials of the panel glass, so the above effect can be obtained without lowering the productivity. Further, since the antireflection film and the antistatic film are provided on the filter substrate, the reflection of light from the display panel of the display device can be suppressed and the generation of static electricity at the display surface of the display device can be prevented.

Second Embodiment

Figure 2:
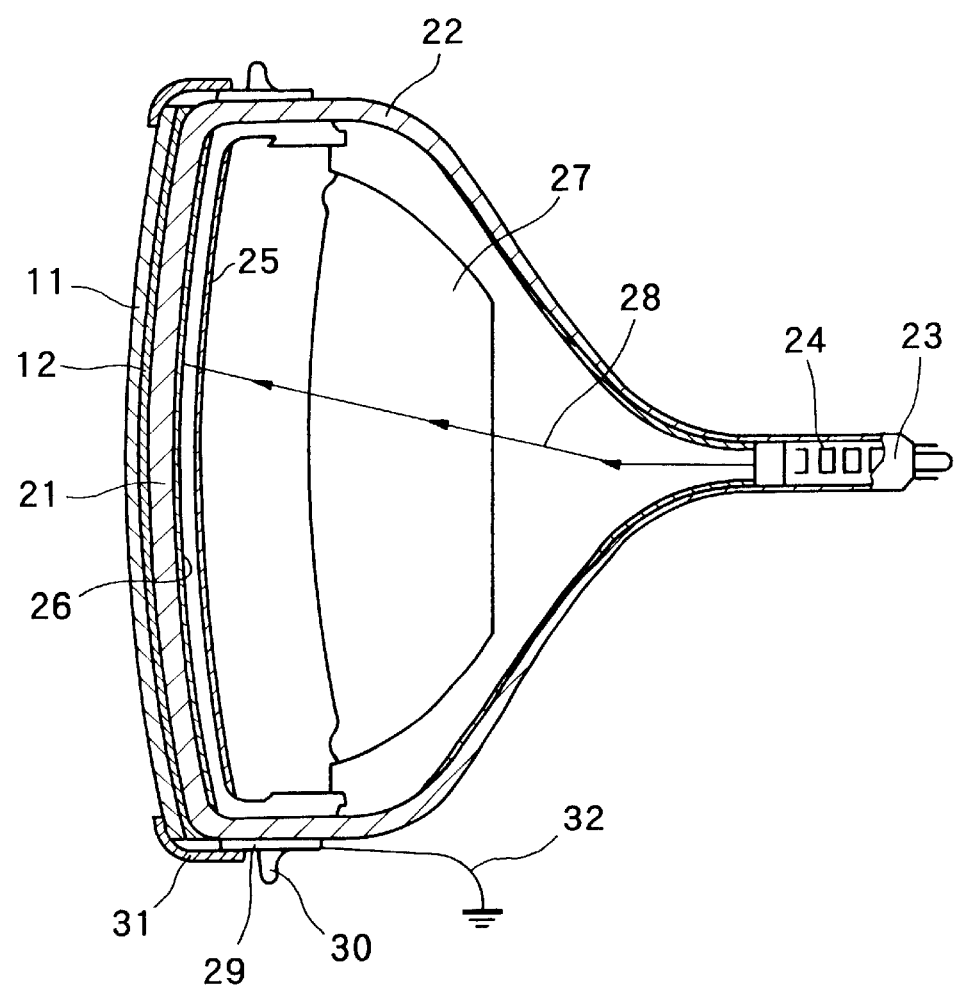
FIG. 2 is a schematic sectional view of a display device according to a second embodiment of the present invention.

FIG. 2 is a schematic sectional view of a display device (color cathode ray tube (CRT)) according to the present embodiment. A vacuum container is constituted by a panel 21, a funnel 22, and a neck tube 23. The panel 21 and the funnel 22 are bonded by frit glass. Around the outer periphery of the panel 21 is wound a tension band 29 for preventing implosion. On the outer circumference of the tension band 29, an attachment ridge 30 is formed. The CRT is fitted via this attachment ridge 30 inside the housing of the display device. The tension band 29 or the attachment ridge 30 is comprised of metal or other conductive substance and grounded through a ground wire 32.

On the inside surface of the panel 21 is formed a fluorescent surface 26 on which fluorescent bodies emitting blue, green, and red light are coated. A color selection mask 25 is arranged close to this fluorescent surface 26. The color selection mask 25 is held at a mask holding frame, and a magnetic shield 27 is mounted at the electron gun side.

The electron beam 28 from the electron gun 24 accommodated in the neck 23 passes through the color selection mask 25 and reaches the fluorescent surface 26 formed on the inside surface of the panel, excites the predetermined fluorescent body and causes this to emit the light.

The functional film 11 is substantially the same as that of the first embodiment and is constituted by, for example, a filter substrate 18 made of transparent plastic, a hard coat film 17, an antistatic film 16, an antireflection film 15, and a stainproofing film 14. The layers can be formed by similar materials as those of the first embodiment.

The antistatic film 16 formed on the functional film 11 is connected to the ground potential via a conductive tape 31 adhered to a plurality of positions of the outer circumference of the functional film 11, tension band 29, and the attachment ridge 30, drains tube surface charge via the ground wire 32, and therefore brings about the antistatic effect. The conductive tape 31 is not particularly limited, but for example a metal foil tape is used. The surface resistance value between the conductive tapes 31 adhered to the electrode portions formed at the two ends of the functional film adhered to the surface of the panel 21 becomes, for example, less than 2000Ω.

The functional film 11 is adhered onto the panel 21 surface by the adhesive layer 12. The adhesive layer 12 comprises as a principal ingredient, for example, an epoxy-based, rubber-based, acrylic-based, silicon-based, or other various types of cross-linking agents or adhesives plus an ultraviolet ray cross-linking reaction promoter and has the function of adjusting the transmittance of the visible light to a predetermined value by adding a dye or a pigment to a predetermined concentration. For example, use can be made of a composition containing 10% by weight of a bisphenol A type epoxy (meth)acrylate having a molecular weight of 550 or more, 20% by weight of urethane (meth)acrylate, 65% by weight of a hydroxy group-containing mono(meth) acrylate, 3% by weight of a photopolymerization initiator, and several percent of an additive. From the viewpoint of stability and uniformity of the transmittance and the durability, a pigment is more preferred. Further, at the selection of the dye or the pigment, ones having a black, gray, or other desired color can be deliberately used. Further, as this adhesive layer 12, in order not to degrade the quality of the text, graphics, etc. displayed on the display screen, the haze value must be 20% or less, preferably 5% or less. The transmittance of the adhesive layer 12 is preferably 90% or less, more preferably 40% to 90%. Further, as the adhesive layer 12, preferably use is made of one adjusted so that the difference between the refractive index of the cured object thereof and the refractive index of the material comprising the display panel of the display device becomes less than 0.8%.

The adhesive layer 12 can be formed by removing the bubbles contained before coating, coating it on the adhering surface of the functional film 11 by for example a flow coating process, a roll coating process, a bar coating process, or the like, then drying it. Further, it is also possible to directly coat this on the panel 21 surface by the above process.

When adhering the panel 21 and the functional film 11 to each other via the adhesive layer 12, the functional film 11 is pushed against the surface of the panel 21 by using a pressurizing roll or the like and the thickness of the adhesive layer 12 is made uniform to prevent the bubbles from remaining or lines and wrinkles from appearing at the surface. The thickness of the adhesive layer 12 is adjusted to for example about 0.05 to 2.5 mm. As the pressurizing roll, use can be made of the metallic roll, a hard rubber roll, a rubber lining metallic roll, or the like.

When solidifying the adhesive layer 12 by for example the irradiation of ultraviolet rays or the irradiation of electron beams from above the functional film 11, use can be made of for example a metal halide lamp, a high pressure mercury lamp, or a xenon lamp as the ultraviolet ray irradiation source and the irradiation energy is suitably 300 to 500 mJ/cm$^2$.

According to the display device of the present embodiment, it is possible to adhere the filter to the panel of the CRT, make the panel glass thinner, and thereby reduce the weight of the display device and possible to prevent the reduction of the contrast of the display screen which occurs when reducing the thickness of the panel glass or forming the antireflection layer. Further, since it is not necessary to switch materials of the panel glass, the above effect can be obtained without lowering the productivity. Further, since the antireflection film and the antistatic film are provided on the filter substrate, the reflection of light from the panel surface of the display device can be suppressed, and the generation of static electricity on the panel surface of the display device can be prevented. Further, the material of the panel glass having a large volume can be standardized to clear glass, so there is a large advantage to industry.

EXAMPLES (1) Preparation of Functional Film

A transparent polyethylene terephthalate (PET) film having a thickness of 100 μm was used as the filter substrate. A hard coat layer for securing the surface hardness was formed by applying a hard coat processing to one side thereof. On the upper surface thereof, an ITO film having a thickness of 120 μm was formed by the sputtering process and used as the antistatic film, then a silicon oxide film having a thickness of 70 μm was formed by the sputtering process and used as the antireflection film. The stainproofing film was formed on the upper layer thereof by a perfluoro group containing coating agent. The functional film was formed by the above.

(2) Formation of Adhesive Layer

Next, an acrylic adhesive adjusted to a transmittance of 50% by the addition of a pigment was uniformly coated on the other surface of the film substrate to a thickness of 50±2 μm and then dried at 60° C. to form an adhesive layer having a predetermined adhesive force. Due to the above, a filter for a display device having the adhesive layer formed on the adhering surface of the filter substrate and having the function of adjusting the transmittance of the visible light to a predetermined value was formed.

(3) Adhesion

Next, a CRT use clear glass panel (EIAJ H-8601) polished by a conventional method is used to assemble the CRT, then the filter for a display device formed as explained above was adhered onto the panel surface of the CRT from one end while applying pressure by a rubber roller and the adhesive layer was solidified by the irradiation of ultraviolet rays to produce the CRT display device.

(4) Performance Evaluation

The transmittance of the display light of the above CRT display device was calculated as follows.

Transmittance (97.0%) of antireflection film× transmittance (50.0%) of adhesive layer×transmittance (95.5%) lowered by amount of reflection (4.5%) of glass panel back surface=46.3% . . . (Equation 1)

In the above calculation, the reflection at the interface between the functional film and the adhesive layer and the interface between the adhesive layer and the panel surface were regarded as negligible since the difference of refractive indexes of the two was slight.

Due to the above, it is possible to obtain a superior quality CRT display device free from the transmittance difference between the center portion and the end portions of the display panel (in a 28-inch flat CRT using EIAJ H-5702 glass, the difference of thicknesses of the panel glass is 3.5 mm, which causes a transmittance difference of about 9%), which could not be avoided due to mechanical strength requirements in a conventional CRT adjusted in transmittance by the glass panel.

Note that the present invention is not limited to the embodiments. For example, the filter for a display device of the present invention can be applied to not only a CRT, but also all other types of display devices having such a CRT and display devices having a panel on which an image is projected. In addition, it can be modified in various ways within the range of the present invention.

Summarizing the effects of the invention, according to the filter for a display device of the present invention, by using the filter adhered onto the display panel of a CRT or other display device, the mechanical strength of the display device can be strengthened, the panel glass can be made thinner in the CRT and the weight of the display device reduced, and in addition the reduction of the contrast of the display screen which occurs when the panel glass is made thinner or an antireflection film is formed can be prevented. Further, it is also not necessary to switch materials of the panel glass, so the above effect can be obtained without lowering the productivity.

Further, according to the display device of the present invention, by adhering the filter onto the panel surface of the CRT and making the panel glass thinner, a reduction of the weight of the display device is possible and the reduction of the contrast of the display screen which occurs when the panel glass is made thinner or an antireflection film is formed can be prevented. Further, since it is also not necessary to switch materials of the panel glass, the above effect can be obtained without lowering the productivity.

What is claimed is:

1. A filter for a display device adhered to a display panel of the display device and strengthening a mechanical strength of the display device, comprising:
    an adhesive layer, a filter substrate, a hard coat film, an antistatic film, an antireflection film, a stainproofing film,
    said filter substrate being disposed between said adhesive layer and said hard coat film, said filter substrate comprising a transparent plastic,
    said hard coat film being disposed between said filter substrate and said antistatic film,
    said antistatic film being disposed between said hard coat film and said antireflection film,
    said antireflection film being disposed between said antistatic film and said stainproofing film wherein said adhesive layer contains a dye or a pigment, said dye or pigment adjusting a transmittance of visible light to a predetermined value.

2. A filter for a display device as set forth in claim 1, wherein said adhesive layer adheres said filter substrate to said display panel.

3. A filter for a display device as set forth in claim 1, wherein said adhesive layer includes a bisphenol A type epoxy (meth)acrylate, urethane (meth)acrylate, a hydroxy group-containing mono(meth)acrylate, and a photopolymerization initiator.

4. A filter for a display device as set forth in claim 1, wherein said filter substrate has a thickness of about 25 to 500 μm.

5. A filter for a display device as set forth in claim 1, wherein said hard coat film has a thickness of about 3 to 10 μm.

6. A filter for a display device as set forth in claim 1, wherein said antistatic film comprises an ITO thin film.

7. A filter for a display device as set forth in claim 1, wherein said antistatic film comprises a conductive film having a thickness of 15 nm to 150 nm.

8. A filter for a display device as set forth in claim 1, wherein said antireflection film is comprised of a plurality of films.

9. A filter for a display device as set forth in claim 8, wherein said plurality of films are alternately stacked thin film materials having different refractive indexes.

10. A display device comprising:
    a cathode ray tube having at its inside a fluorescent surface emitting light upon being subjected to an electron beam emitted from an electron gun and having a filter for strengthening a mechanical strength of the cathode ray tube adhered to a display panel of the cathode ray tube,
    wherein said filter includes an adhesive layer, a filter substrate, a hard coat film, an antistatic film, an antireflection film, a stainproofing film, said filter substrate being disposed between said adhesive layer and said hard coat film, said filter substrate comprising a transparent plastic, said hard coat film being disposed between said filter substrate and said antistatic film, said antistatic film being disposed between said hard coat film and said antireflection film, said antireflection film being disposed between said antistatic film and said stainproofing film, wherein said adhesive layer contains a dye or a pigment, said dye or pigment adjusting a transmittance of visible light to a predetermined value.

11. A display device as set forth in claim 10, wherein said adhesive layer adheres said filter substrate to said display panel.

12. A display device as set forth in claim 10, wherein said adhesive layer includes a bisphenol A type epoxy (meth)acrylate, urethane (meth)acrylate, a hydroxy group-containing mono(meth)acrylate, and a photopolymerization initiator.

13. A display device as set forth in claim 10, wherein said filter substrate has a thickness of about 25 to 500 $\mu$m.

14. A display device as set forth in claim 10, wherein said hard coat film has a thickness of about 3 to 10 $\mu$m.

15. A display device as set forth in claim 10, wherein said antistatic film comprises an ITO thin film.

16. A display device as set forth in claim 10, wherein said antistatic film comprises a conductive film having a thickness of 15 nm to 150 nm.

17. A display device as set forth in claim 10, wherein said antireflection film is comprised of a plurality of films.

18. A display device as set forth in claim 17, wherein said plurality of films are alternately stacked thin film materials having different refractive indexes.

* * * * *